(12) United States Patent
Dauphin et al.

(10) Patent No.: US 9,776,341 B2
(45) Date of Patent: Oct. 3, 2017

(54) LOW DENSITY COMPOSITE MATERIALS, THEIR PRODUCTION AND USE

(71) Applicant: Hexcel Composites SASU, Dagneux (FR)

(72) Inventors: Claude Dauphin, Dagneux (FR); Dominique Espitallier, Dagneux (FR); Jimmy Grondin, Dagneux (FR)

(73) Assignee: Hexcel Composites SASU, Dagneux (FR)

( * ) Notice: Subject to any disclaimer, the term of this patent is extended or adjusted under 35 U.S.C. 154(b) by 425 days.

(21) Appl. No.: 14/405,789

(22) PCT Filed: May 31, 2013

(86) PCT No.: PCT/EP2013/061322
§ 371 (c)(1),
(2) Date: Dec. 5, 2014

(87) PCT Pub. No.: WO2013/182497
PCT Pub. Date: Dec. 12, 2013

(65) Prior Publication Data
US 2015/0174791 A1 Jun. 25, 2015

(30) Foreign Application Priority Data
Jun. 8, 2012 (EP) .................... 12171368

(51) Int. Cl.
| | |
|---|---|
| *B29B 11/16* | (2006.01) |
| *B29C 44/04* | (2006.01) |
| *B32B 5/18* | (2006.01) |
| *B32B 5/24* | (2006.01) |
| *B32B 5/10* | (2006.01) |
| *B29K 63/00* | (2006.01) |
| *B29K 105/04* | (2006.01) |
| *B29K 105/08* | (2006.01) |
| *B29L 9/00* | (2006.01) |

(52) U.S. Cl.
CPC .............. *B29B 11/16* (2013.01); *B29C 44/04* (2013.01); *B32B 5/10* (2013.01); *B32B 5/18* (2013.01); *B32B 5/245* (2013.01); *B29K 2063/00* (2013.01); *B29K 2105/04* (2013.01); *B29K 2105/0872* (2013.01); *B29L 2009/005* (2013.01); *B32B 2250/02* (2013.01); *B32B 2260/046* (2013.01); *B32B 2262/106* (2013.01); *B32B 2305/076* (2013.01); *Y10T 428/24967* (2015.01); *Y10T 428/249953* (2015.04); *Y10T 428/269* (2015.01); *Y10T 428/31511* (2015.04)

(58) Field of Classification Search
CPC ........... B29B 11/16; B32B 5/245; B32B 5/18; B29C 44/04
See application file for complete search history.

(56) References Cited

U.S. PATENT DOCUMENTS

| | | | |
|---|---|---|---|
| 3,598,671 A | 8/1971 | Wortman | |
| 2003/0129912 A1* | 7/2003 | Kolzer | B29C 44/358 442/387 |

FOREIGN PATENT DOCUMENTS

| | | |
|---|---|---|
| JP | 5310982 | 11/1993 |
| WO | 02076701 | 10/2002 |

* cited by examiner

*Primary Examiner* — Robert Harlan
(74) *Attorney, Agent, or Firm* — W. Mark Bielawski; David J. Oldenkamp

(57) ABSTRACT

Laminar structures comprising a fiber reinforced layer bonded to an expandable filler containing layer to provide improved flexural stiffness to weight ratio at lower fiber loading; a process for the manufacture of the laminar structures in which the material are selected so that migration of the expandable filler into the fiber structure of the fiber reinforced layer as they expand is minimized or prevented.

11 Claims, No Drawings

LOW DENSITY COMPOSITE MATERIALS, THEIR PRODUCTION AND USE

The present invention relates to laminar structures and a process for the manufacture of laminar structures. In a further embodiment the invention relates to the use of the laminate or structure in various applications.

Laminar structures are widely known and are composed of a variety of layers bonded to each other, the nature and composition of the layers being selected according to the physical properties required and the uses to which the laminar structure is to be put. A variety of laminar structures have been proposed to provide lightweight strength in uses such as the aerospace, automobile and construction markets. The present invention is particularly concerned with laminar structures useful in such applications. Laminar structures are known for example from U.S. Pat. No. 481,649 which comprise one or more fibre reinforced layers bonded to a foamed layer. The fibre reinforced layer may be a fibre reinforced epoxy resin prepreg in which the fibre may be carbon fibre, aramid (Kevlar) fibres or glass fibres.

Composite sandwich structures with a foam core are known and have been proposed as materials having significant strength and stiffness together with an advantage derived from weight considerations. For example the abstract of Japanese Patent publication JP 58049223 A2 discloses sandwich structures comprising epoxy foam sandwiched between two metal plates. Two articles by S. Venkatraman and Kishore, the first in the Journal of Reinforced Plastics and Composites Vol 16 No. 7/1997 and the second in the Journal of Reinforced Plastics and Composites Vol 17 No. 8/1998 disclose composites comprising a thin layer of flexible foam sandwiched between two thick layers of glass-epoxy resin materials.

U.S. Pat. No. 3,598,671 discloses a method of preparing foam plastic laminated structures in which at least one component of a foam forming material is applied as a coating onto the surface of one sheet of a base material. A further component of the foam forming material is applied as a coating onto the surface of a second sheet of the base material. The sheets are then brought together so that they foam and produce a foamed core plastic laminated structure. Example 2 of U.S. Pat. No. 3,598,671 produces such a laminate comprising a layer of epoxy foam ¼ inch thick sandwiched between two layers of fiberglass each approximately ⅛ inch thick. Accordingly the combined thickness of the two layers of fiberglass is substantially the same as the thickness of the foam. The foam is also extremely heavy, having a weight of 7.5 lbs per square foot.

The fibrous layer of these laminates is typically what is known as a "prepreg".

A prepreg is a fibrous structure which is partly or completely impregnated with a resin and which is processed by applying heat together with pressure and/or vacuum to cure the resin. The resin is typically a thermoset resin comprising one or more resin components comprising an activator or catalyst and a curing agent in addition to a base resin. The viscosity of a prepreg resin system is strongly affected by temperature. On heating the prepreg material, the resin viscosity drops dramatically, allowing it to flow around the fibres whilst the material maintains a necessary flexibility to conform to mould shapes. However, as the prepreg is heated beyond a certain point (activation temperature) the resin becomes more reactive and cross-linking (curing) of the resin molecules accelerates to form an interpolymer network (IPN). The progressive polymerisation increases the viscosity of the resin in the prepreg until it has passed a point where it will not flow at all ('no flow point'). The reaction then proceeds to full cure. Depending on the resin chemistry the curing process can take place at different temperatures, typically temperatures in excess of 40° C.

For some applications in for example the automobile and aerospace industry, it is desirable to produce articles (such as engine hoods, body panels, spoilers, etc.), which not only have a consistent quality but which are also light weight, and have excellent mechanical properties and a smooth surface finish.

A common moulding material for these applications consists of a sheet moulding compound (SMC). This material is essentially a prepreg comprising discontinuous fibrous reinforcement in the form of strands which are preimpregnated with a resin system. The resin system comprises a resin paste intermixed with a filler to modify the density of the material. The addition of the filler also reduces the cost of the material. The SMC material is formed by applying fibrous reinforcement material layers onto a resin layer which comprises the resin system and filler to form a laminate. The laminate is pressed between impregnation rollers to drive the resin system into the reinforcement layers to form the prepreg SMC material.

One of the problems with laminates of filler and fibre reinforced layers is that a high level of fibres (about 40 wt %) is required to obtain the desired mechanical properties including strength and particularly the flexural stiffness of the laminar structure. Another difficulty has been to obtain a strong bond between the foamed layer and the fibre containing layer without adversely affecting the properties of one or both of the layers. Another issue is that as filler migrates from the resin, it can move into the fibre layer and appear on the surface of the laminate which results in surface imperfections such as dimples.

Finally, the presence of filler in the resin reduces the flow properties of the resin during manufacture of the prepreg. This can prevent the resin from impregnating the fibrous material if the concentration of the filler in the resin is too high. Also, high concentrations of filler can cause prepreg process machinery to malfunction due to the reduced flow properties of the resin.

The present invention aims to obviate or at least mitigate the above described problems and/or to provide improvements generally.

According to the invention, there is provided a structure, a process and a use as defined in any one of the accompanying claims.

The present invention therefore provides a laminar structure comprising a fibre reinforced layer containing from 10 to 40 wt % fibres bonded to a layer comprising a matrix containing from 0.1% to 50% by weight in relation to the matrix of expandable filler. The matrix may contain from 0.1% to 40% by weight in relation to the matrix of expandable filler, from 0.1% to 30% by weight in relation to the matrix of expandable filler, from 0.1% to 20% by weight in relation to the matrix of expandable filler, from 0.1% to 10% by weight in relation to the matrix of expandable filler, or from 0.1% to 5% by weight in relation to the matrix of expandable filler. Preferably, the matrix contains from 1% to 5% by weight in relation to the matrix of expandable filler.

We have now found that by careful selection of the materials for both the fibre reinforced layer and the filler in the resin a stiffer laminate may be obtained with lower fibre loading whilst having a reduced density. Additionally we have found that by the selection of these materials and the selection of processing conditions to control the viscosity of the resin, laminar structures with a strong bond between the fibrous layer or layers and the filler containing layer or layers without adversely impacting the properties provided by the layers can be provided and that penetration of the filler into the fibre containing layer can be minimised or even prevented.

In a further embodiment the invention provides a laminar structure comprising a fibre reinforced layer containing from 10 to 40 wt % fibres bonded to a layer comprising a matrix containing expanded filler. The fibre reinforced layer may contain from 10 to 80 wt % fibres, or from 10 to 70 wt % and more preferably from 25 to 65 wt % of fibres. In a preferred embodiment, the fibre reinforced layer may contain 38 wt % of resin and 62 wt % of fibres. The matrix that contains the filler is typically a curable resin. Any resin that cures under the prevailing conditions may be used. Generally the resin is thermosetting and epoxy resins, urethane resins and phenoxy resins are preferred. A curing agent may additionally be included in the resin to aid in the control of processing time to full cure and cure temperature.

Resin and fibre content of uncured moulding materials or structures are determined in accordance with ISO 11667 (method A) for moulding materials or structures which contain fibrous material which does not comprise unidirectional carbon. Resin and fibre content of uncured moulding materials or structures which contain unidirectional carbon fibrous material are determined in accordance with DIN EN 2559 A (code A). Resin and fibre content of cured moulding materials or structures which contain carbon fibrous material are determined in accordance with DIN EN 2564 A.

The fibre and resin volume % of a prepreg moulding material or structure can be determined from the weight % of fibre and resin by dividing the weight % by the respective density of the resin and carbon fiber.

The % of impregnation of a tow or fibrous reinforcement material which is impregnated with resin is measured by means of a water pick up test. The water pick up test is conducted as follows. Six strips of prepreg are cut of size 100 (+/−2) mm×100 (+/−2) mm. Any backing sheet material is removed. The samples are weighed near the nearest 0.001 g (W1). The strips are located between PTFE backed aluminium plates so that 15 mm of the prepreg strip protrudes from the assembly of PTFE backed plates on one end and whereby the fiber orientation of the prepreg is extends along the protruding part. A clamp is placed on the opposite end, and 5 mm of the protruding part is immersed in water having a temperature of 23° C., relative air humidity of 50%+/−35%, and at an ambient temperature of 23° C. After 5 minutes of immersion the sample is removed from the water and any exterior water is removed with blotting paper. The sample is then weighed again W2. The percentage of water uptake WPU (%) is then calculated by averaging the measured weights for the six samples as follows: WPU (%)= [(<W2>−<W1>)/<W1>)×100. The WPU (%) is indicative of the Degree of Resin Impregnation (DRI).

The expandable filler may comprise an expandable foam material, expandable filler particles, expandable graphite and in particular expandable microsphere particles.

The laminar structures of this invention may contain one or more layers of each of the fibre reinforced layer and the layer comprising a matrix containing the expandable filler. In a further embodiment the laminar structures of the present invention may be provided with additional layers selected according to the use to which the laminar structure is to be put.

In a preferred embodiment the fibre reinforced layer of the structures of the present invention may be a prepreg and is preferably a fibre reinforced thermoplastic or thermoset resin such as an epoxy resin. The fibre may be any suitable fibre such as glass, aramid or carbon fibre of any suitable denier and length. The fibre material may be woven or non-woven. The fibrous reinforcement material may also comprise multiple layers of fibrous material. Preferably, the fibrous reinforcement layers comprises oriented fibres. The invention allows the production of desirable structures at lower fibre loading. The fibre loading may be 10 to 40 wt % of the structure preferably 10 to 30 wt % more preferably 10 to 25 wt % of the structure. The fibre reinforced layer is preferably a prepreg.

The fibrous material layer may comprise a weight ranging from 5 to 2000 gsm, from 5 to 1500 gsm, or from 50 to 1200 gsm, or from 5 to 800 gsm (g/m$^2$), preferably from 30 to 600 gsm and more preferably from 50 to 400 gsm. The thickness of the fibrous layer may range from 0.1 mm to 10 mm, preferably from 0.5 mm to 10 mm, more preferably from 1 to 10 mm. The fibrous material may also be chopped. The fibre length may vary from 1 mm to several meters, preferably from 5 mm to 100 mm, more preferably from 10 mm to 100 mm or less.

In a further preferred embodiment the matrix containing the expandable filler is a curable resin and the resin properties are controlled so that the filler can expand under conditions, temperature and/or pressure, before the resin is fully cured.

Because prepregs are often used to form reinforcing components, such as parts for airplanes, the resulting components must meet high quality standards. Although fast cure times for the fibre containing layer are desirable any reduction in cure time should not negatively affect the mechanical properties, such as tensile strength, compression and flexural strength or flexural stiffness and shear stress, of such composite components.

In addition to preferring prepregs that have shorter cure times, composite component manufacturers also desire prepregs that cure at lower temperatures, particularly manufacturers who fabricate large scale composite components, such as those that might be employed in aviation or marine applications (boat hulls, for example). Low temperature curing prepregs are desirable for manufacture of large parts because such low temperatures require less sophisticated heating systems, and much reduced energy costs, which can be significant for large scale parts.

If an epoxy resin is used in the fibre containing layer it may be selected from the many different types of epoxy resins systems that are known in the art. Different combinations of epoxy resins, curing agents, and catalysts (also known as accelerators) have been formulated. A balance of desirable properties for prepregs include the following: (1) a tacky, dough-like consistency prior to curing; (2) low reactivity at room temperature; and, (3) a high degree of cure after heating for no more than 2 hours at no more than 180° C.

Suitable resin materials may be selected from the group consisting of thermoset resins such as epoxy, bismaleimide resin, cyanate ester and phenolic resins. Suitable epoxy resins include diglycidyl ethers of bisphenol A, diglycidyl ethers of bisphenol F, epoxy novolac resins and N-glycidyl ethers, glycidyl esters, aliphatic and cycloaliphatic glycidyl ethers, glycidyl ethers of aminophenols, glycidyl ethers of any substituted phenols and blends thereof. Also included are modified blends of the aforementioned thermosetting polymers. These polymers are typically modified by rubber or thermoplastic addition. Any suitable catalyst may be used. The catalyst will be selected to correspond to the resin used. One suitable catalyst for use with an epoxy resin is a dicyandiamide curing agent. The catalyst may be accelerated. Where a dicyandiamide catalyst is used, a substituted urea may be used as an accelerator. Suitable accelerators or catalysts include Diuron, Monuron, Fenuron, Chlortoluron, bis-urea of toluenediisocyanate and other substituted homologues. The epoxy curing agent may be selected from Dapsone (DDS), Diamino-diphenyl methane (DDM), BF3-amine complex, substituted imidazoles, accelerated anhydrides, metaphenylene diamine, diaminodiphenylether, aromatic polyetheramines, aliphatic amine adducts, aliphatic amine salts, aromatic amine adducts and aromatic amine salts.

The following documents provide examples of thermosetting resin compositions known in the art. WO-A-99/36484 describes a composite system that includes an epoxy resin having two or more epoxide groups per molecule, a latent hardener and at least one solid organic acid that is substantially insoluble in the resin formulation. U.S. Pat. No. 3,759,914 (Simms) discloses an epoxy resin formulation including a polyepoxide having a plurality of epoxide groups, a latent amine curing agent and an accelerator having a defined formula. U.S. Pat. No. 3,386,956 (Nawakowski) describes an epoxy resin formulation including a primary curing agent selected from a range of bis- and polyureas and a promoter selected from four compounds, including a dicyandiamide (DICY) in order to increase the cure rate at low temperatures (less than 86° C.). The bis-ureas described include 2,4-di(N,N-dimethylureido) toluene, referred to in U.S. Pat. No. 3,386,956 and hereinafter as 2,4-toluene bis dimethyl urea. A similar epoxy formulation is disclosed in U.S. Pat. No. 3,945,971 (Harrison), which employs a polyamine curing agent and a phenyl urea based accelerator (see also U.S. Pat. No. 3,988,257 for related methods). U.S. Pat. No. 3,956,237 (Doorakian) describes an epoxy resin formulation including a latent amine curing agent and a latent accelerator. A number of latent accelerators are disclosed, including a specific blend of different isomers of toluene bis dimethyl urea. U.S. Pat. No. 4,569,956 discloses a rapid, low temperature curing epoxy resin adhesive composition comprising a polyepoxide, a catalytic amount of HBF4, a finely divided filler (preferably an acidic filler) and, optionally, a polyalkylene ether glycol. Yet another epoxy formulation is disclosed in U.S. Pat. No. 4,783,518 (Goel), which teaches a rapid curing epoxy composition including a polyepoxide, a latent amine curing agent, a novel thiocyanate salt of the reaction product of an alkylene polyamine (such as ethylene diamine) and a bicyclic amide acetal. U.S. Pat. No. 5,407,978 (Bymark) describes an epoxy formulation which includes a dihydric bisphenol curing agent and an immidazole based accelerator to increase the cure rate. As a final example, U.S. Pat. No. 5,599,629 (Gardner) describes an epoxy resin formulation including a resin with at least three epoxide groups per molecule and a specific aromatic amine latent curing agent, the aforementioned formulation being specifically employed to produce prepregs.

Several different methods can be used to fabricate prepregs useful in this invention including a solventless, hot melt impregnation method, and a solvent method. The resin system may also be B-staged chemically. Chemical B-staging involves mixing a B-staging component, such as IPDA, into the resin system. The B-staging component reacts with the other components in the resin system which results in a reduced viscosity of the resin system. The reduced viscosity of the resin aids mixing of filler in the resin and also promotes the application of the resin system onto a substrate such as the impregnation of a fibrous reinforcement material with the resin system. Once the B-staging component has reacted with other resin components, the viscosity of the resin system is again increased.

In a typical hot melt impregnation process, continuous sheets of resin film supported by release paper are impregnated into fibre sheets under heat, pressure, and tension. The resin has to have a certain viscosity at impregnation temperature so that the resin can wet-out the fibre. Furthermore, specific tack, drape, and shelf-life characteristics are required when utilizing the hot melt method. In contrast, a solvent-diluting impregnation method does not have such strict requirements. However, a superior prepreg is often achieved by the hot melt method, because micro-voids, caused by off gassing of volatile solvent, are often observed in prepregs prepared by the solvent-diluting impregnation method. The resin matrix is preferably chosen so that it's cure is synchronised with the expansion of the filler and the curing of the matrix containing the filler so that the filler expands but has little if any penetration into the fibrous layer and does not cause damage to the fibrous layer.

In an embodiment, the resin may comprise a resin composition that includes an epoxy resin having, on average, at least two epoxide groups per molecule, and a catalyst comprising 2,4-toluene bis dimethyl urea, preferably in an amount, by weight of total catalyst, more preferably by weight of total urea catalyst, of at least 70 wt %, still more preferably at least 95 wt %, and especially preferably consisting of, 2,4-toluene bis dimethyl urea. Preferably, the composition also includes at least one latent curing agent. In at least one embodiment, the at least one latent curing agent is an amine type curing agent, preferably a dicyanopolyamide, most preferably DICY. The viscosity of the composition is preferably less than about 20,000 poise at about 40° C. The matrix composition is curable, preferably to at least 95% cure, (i) on heating to a temperature of 150° C. for 3 minutes, to provide a composition having a glass transition temperature of at least, preferably higher than, 140° C., and/or (ii) on heating to a temperature of 80° C. for 5 hours, to provide a composition having a glass transition temperature of at least, preferably higher than, 100° C.

Such compositions may comprise (a) an epoxy resin having an average of at least two epoxy groups per molecule, which epoxy resin comprises at least one bisphenol, preferably bisphenol A, based epoxy resin component, the or each bisphenol, preferably bisphenol A, component having an epoxide equivalent weight of from 150 to 1500, preferably 170 to 1400; and (b) a catalyst, at least 70%, more preferably at least 95%, by weight of which is 2,4-di(N,N-dimethylureido)toluene.

The resin materials may contain a toughening agent. Suitable toughening agents can be selected from liquid rubber (such as acrylate rubbers, or carboxyl-terminated acrylonitrile rubber), solid rubber (such as solid nitrite rubber, or core-shell rubbers) in the nano or macro size range, thermoplastics (such as poly (EtherSulphone), poly (Imide)), block copolymers (such as styrene-butadiene-methacrylate triblocks), High modulus particles (such as Silica) in the nano or macro size range or blends thereof. Other thermoplastic additives that toughen the cured resin include from polyvinylformals (PVFs) (more preferred), polymethylmethacrylates (PMMAs), polyarylethersulfones (PESs), polysulfones (PSFs), polyimides (PIs), polyetherimides (PEIs) and polyethylene oxides (PEOs).

Preferably the epoxy resin utilized in this invention comprises at least one epoxy resin component selected from bisphenol based epoxy resins (for example, bisphenol A based epoxy resins or bisphenol F based epoxy resins), epoxy phenol novolacs, trifunctional epoxy resins, tetrafunctional epoxy resins, and halogenated derivatives thereof. More preferably the epoxy resin includes diglycidyl ethers of bisphenols (examples of which are bisphenol A and bisphenol F), epoxy phenol novolacs, trifunctional epoxy resins, tetrafunctional epoxy resins and halogenated derivatives thereof. When the epoxy resin comprises at least one bisphenol, especially bisphenol A, component, the or each component preferably has an epoxide equivalent weight of from about 150 to about 1500, preferably from about 170 to about 1400. The epoxy resin may consist of a bisphenol, especially bisphenol A, having an epoxide equivalent of from about 150 to about 1500, preferably from about 170 to about 1400. Alternatively, the bisphenol, especially bisphenol A, may be a blend of a first bisphenol, especially bisphenol A-type, epoxy resin having an epoxy equivalent in the range of from about 150 to about 1500, more preferably from about 170 to about 195, still more preferably from about 180 to about 195, and a second bisphenol, especially bisphenol A-type epoxy resin having an epoxy equivalent in the range of from about 400 to 1500, preferably from about 1200 to about 1400, the amount and the molecular weight of the second epoxy resin being such that the blended bisphenol epoxy resin has an average epoxy equivalent weight in a range of from about 200 to about 800 and preferably has a number average molecular weight in a range of from about 200 to about 300.

Preferably, an amount of the catalyst included in the composition ranges from about 0.5 to about 10 phr (i.e. parts per hundred of epoxy resin). Most preferably, the amount ranges from about 2 to about 5 phr.

In at least one embodiment, the epoxy resin is at least 95% cured after being heated to 150° C. for at least 3 minutes, preferably no more than five minutes, and/or at least 95% cured after being heated to 120° C. for no more than 20 minutes. Preferably, after being cured at 150° C., the composition has a Tg that is at least, preferably higher than 140° C., such that the composition does not need to be cooled before being removed from a mould. Importantly, cooling of the moulding or composition following moulding is not necessary as this would render the process inefficient as this would extend the processing time of the material.

A preferred resin composition includes an epoxy resin and also preferably includes a latent amine curing agent, and a catalyst comprising at least 70%, more preferably at least 95%, by weight of the catalyst of, and still more preferably consisting of, 2,4-toluene bis dimethyl urea, the epoxy resin is made from a diglycidyl ether of a bisphenol, which has an average epoxy equivalent weight of from about 200 to about 800 and preferably has an average molecular weight in the range of from about 200 to about 300.

In an embodiment, there is provided a curable laminar structure suitable for use in automotive applications, whereby the curable laminar structure comprises expandable filler and a rapid cure resin. Rapid cure resin systems are those capable of curing within 2, 4, 6, 8, 10 or 12 minutes at temperatures of less than 160° C., or less than 150° C. or less than 140° C., or less than 130° C. and/or any combination of the aforesaid cure times and cure temperatures. An example of a suitable rapid cure epoxy resin cures with a Tg of 140° C. in no more than 4 minutes at 120° C. or no more than 2.5 minutes at 150° C. A curable laminar structure comprising a rapid cure resin and expandable filler once cured has a comparatively lower volume of thermoset material. Therefore, such a curable laminar structure requires a lower energy input, applied for a shorter duration to achieve full cure. This reduces the energy costs associated with part production. Embodiments of the present invention also provide a reduction of material cost by reducing the carbon fibre density. Thus embodiments of this nature are particularly suited for use in automotive applications where speed and cost of processing are limiting factors for the use of composites.

A suitable rapid cure epoxy resin composition may comprise one or more urea based curing agents and it is preferred to use from 4 to 10 wt % based on the weight of the epoxy resin of a curing agent, more preferably 4 to 6 wt %, more preferably from 4 to 5 wt %. Preferred urea based materials are the isomers of 2.6 and 2.4 toluene bis dimethyl urea (known as 2.6 and 2.4 TDI urone) such as the range of materials available under the commercial name DYHARD® the trademark of Alzchem, urea derivatives. The composition further comprises a hardener such as dicyandiamide and it is preferred to use from 7% to 10%, more preferably from 8 to 10, most preferably from 8.5 to 9.5% by weight of the hardener. The rapid cure time is achieved by matching the ratio of the curative and the accelerator to the amount of available reactive groups in the epoxy formulation. The higher Tg is obtained by use of a resin having a functionality of at least 2 to provide sufficient reactive groups. The handleability of the prepreg is likewise determined by the nature and amount of the fibrous reinforcement and the nature and amount of the epoxy resin.

Epoxy formulations typically contain epoxy resins which may be selected from a wide range of epoxy containing materials according to the cure cycle to be employed and the nature of the finished article to be produced. Epoxy resins can be solid, liquid or semi-solid and are characterised by their functionality and epoxy equivalent weight. The functionality of an epoxy resin is the number of reactive epoxy sites per molecule that are available to react and cure to form the cured structure. For example, a bisphenol-A epoxy resin which has a functionality of 2, certain glycidly amines can have a functionality of more than 4. The reactivity of an epoxy resin is indicated by its epoxy equivalent weight (EEW). The lower the EEW, the higher the reactivity. The EEW is the weight of epoxy resin material in grams containing 1 gram per mole of epoxy groups.

The resin matrix of the present invention contains a reactive epoxy resin composition that can be cured over a short moulding cycle time, to allow the cured material to be removed from the mould shortly after curing. Epoxy formulations may also include catalysts and/or curatives and these may also be selected according to the nature of the epoxy resin, the product to be produced and the cure cycle that is required.

The curing of epoxy resin is an exothermic reaction and care must be taken to avoid reaction runaway and the overheating of the material in the mould which can cause damage to both the moulding materials and the mould itself.

The cure cycles employed for curing resin matrices in composite materials such as prepregs and stacks of prepregs are a balance of temperature and time taking into account the reactivity of the resin and the amount of resin and fibre employed. From an economic point of view it is desirable that the cycle time be as short as possible and so curing agents and accelerators are usually included in the epoxy resin. As well as requiring heat to initiate curing of the resin, the curing reaction itself can be highly exothermic and this needs to be taken into account in the time/temperature curing cycle in particular for the curing of large and thick stacks composite material. This is increasingly the case with the production of laminates for industrial applications which require large amounts of epoxy resin which in turn can result in excessive temperatures being generated within the stack due to the exotherm of the resin curing reaction. Excessive temperatures are to be avoided as they can damage the mould reinforcement or cause some decomposition of the resin. Excessive temperatures can also cause loss of control over the cure of the resin leading to run away cure.

Previous attempts to reduce the time required for the curing reaction by appropriate selection of the epoxy resin or resins used, the amount and nature of the curative and the amount and nature of the catalyst have had limited success in reducing the time required for the curing reaction, they have however not successfully provided an easily handleable composite material which has a sufficiently fast reaction time to produce a material with a sufficiently high Tg to enable removal from the mould without requiring time to enable the cured product to be handleable. It is also important that speeding up the cure time does not undesirably impact the combination of mechanical properties required in the laminar structure to be produced from the composite.

The need for higher Tg must therefore be balanced with requirements for handleability of the prepreg and with the economic needs to minimise the time required for the moulding cycle. The epoxy resin matrix in the present invention provides a laminar structure that can be easily provided to a mould, can be cured rapidly at a particular temperature and which enables the cured material to be demoulded at temperatures near to or at the curing temperature.

The matrix of the present invention comprises an epoxy resin formulation containing a curative that can be cured at 150° C. in no more than 150 seconds, can be cured at 120° C. in no more than 4 minutes to provide a cured resin having a Tg no greater than 140° C. The cured epoxy resin formulation preferably has a Phase angle below 20° C. at a temperature below 140° C.

Within this application, the cure time for the resin matrix formulation is defined as the time required for 95% cure. The Tg of the resin is measured according to Differential Mechanical Analysis according to (Test Method ASTM D7028) and the Tg is considered to be the temperature at which there is an onset of the drop in storage modulus.

The matrix composition may comprise one or more urea based curing agents and it is preferred to use from 4 to 10 wt % based on the weight of the epoxy resin of a curing agent, more preferably 4 to 6 wt %, more preferably from 4 to 5 wt %. Preferred urea based materials are the isomers of 2.6 and 2.4 toluene bis dimethyl urea (known as 2.6 and 2.4 TDI urone) such as the range of materials available under the commercial name DYHARD® the trademark of Alzchem, urea derivatives. The composition further comprises a hardener such as dicyandiamide and it is preferred to use from 7% to 10%, more preferably from 8 to 10, most preferably from 8.5 to 9.5% by weight of the hardener.

The matrix may contain the aforedescribed expanded and/or expandable filler.

The rapid cure time is achieved by matching the ratio of the curative and the accelerator to the amount of available reactive groups in the epoxy formulation. The higher Tg is obtained by use of a resin having a functionality of at least 2 to provide sufficient reactive groups. The handleability of the prepreg is likewise determined by the nature and amount of the fibrous reinforcement and the nature and amount of the epoxy resin.

In another embodiment the present invention relates to the production of laminar structures by laying up a stack of layers of prepregs employing the resin formulation of this invention containing the aforesaid filler and causing the stack to cure. Such layers of curable structures in which the resin is uncured are sometimes known as prepregs.

We have found that such desirable structures may be obtained if the epoxy resin has a functionality of at least two and is cured in the presence of a hardener such as dicyandiamide and in the presence of a urea based curing agent. The relative amount of the curing agent and the epoxy resin that should be used will depend upon the reactivity of the resin and the nature and quantity of the fibre reinforcement in the structure.

Typically higher than normal amounts are used in order to get the rapid cure and we prefer to use from 4 to 10 wt %, more preferably 4 to 6 wt % of the urea based curing agent. A particularly good results have been obtained when using from 4.25 to 4.75 wt % of the urea based curing agent based on the weight of epoxy resin is used and from 6 to 10 wt %, more preferably 7 to 10 wt % of the hardener such as dicyandiamide should be used, particularly good results have been obtained when using 8.5 to 9.5 wt % dicyandiamide especially in combination with 4.25 to 4.75 wt % of the urea based curing agent.

Typically, the values for the resin content by weight for the uncured structure of the invention are in the ranges of from 15 to 70% by weight of the structure, from 18 to 68% by weight of the structure, from 20 to 65% by weight of the structure, from 25 to 60% by weight of the structure, from 25 to 55% by weight of the structure, from 25 to 50% by weight of the structure, from 25 to 45% by weight of the structure, from 25 to 40% by weight of the structure, from 25 to 35% by weight of the structure, from 25 to 30% by weight of the structure, from 30 to 55% by weight of the structure, from 35 to 50% by weight of the structure and/or combinations of the aforesaid ranges.

In a preferred embodiment the interior of the fibrous material is at least partially resin free to provide an air venting path or structure, so that air that may be present in the tows from the outset or that may be introduced during impregnation with the liquid resin is not trapped within the structure by the resin and can escape during preparation and consolidation of the structure. The air is able to escape along the length of the tows and also from the second side of the fibrous layer if the impregnation by the resin is such that some or all of the surface of the second side of the fibrous layer is not carrying resin.

The matrix comprising the epoxy resin of functionality at least 2 used in this invention has a high reactivity. The epoxy equivalent weight (EEW) of the resin is in the range from 150 to 1500, preferably of from 200 to 500 and the resin composition comprises the epoxy resin in combination with an accelerator or curing agent. Suitable epoxy resins may comprise blends of two or more epoxy resins selected from monofunctional, difunctional, trifunctional and/or tetrafunctional epoxy resins. Suitable difunctional epoxy resins, by way of example, include those based on: diglycidylether of bisphenol F, diglycidyl ether of bisphenol A (optionally brominated), phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, glycidylesters or any combination of the aforesaid components.

Difunctional epoxy resins may be selected from diglycidyl ether of bisphenol F, diglycidylether of bisphenol A, diglycidyl dihydroxy naphthalene, or any combination thereof. Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl amines, heterocyclic glycidyl imidines and amides, glycidyl ethers, fluorinated epoxy resins, or any combination thereof. Suitable trifunctional epoxy resins are available from Huntsman Advanced Materials (Monthey, Switzerland) under the tradenames MY0500 and MY0510 (triglycidyl para-aminophenol) and MY0600 and MY0610 (triglycidyl meta-aminophenol). Triglycidyl meta-aminophenol is also available from Sumitomo Chemical Co. (Osaka, Japan) under the tradename ELM-120.

Suitable tetrafunctional epoxy resins include N,N,N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY0720 and MY0721 from Huntsman Advanced Materials). Other suitable multifunctional epoxy resins include DEN438 (from Dow Chemicals, Midland, Mich.) DEN439 (from Dow Chemicals), Araldite ECN 1273 (from Huntsman Advanced Materials), and Araldite ECN 1299 (from Huntsman Advanced Materials).

The reinforcing fibres may be synthetic or natural fibres or any other form of material or combination of materials that, combined with the resin composition of the invention, forms a composite product. The reinforcement web can either be provided via spools of fibre that are unwound or from a roll of textile. Exemplary fibres include glass, carbon, graphite, boron, ceramic and aramid. Preferred fibres are carbon and glass fibres particularly carbon fibres.

Hybrid or mixed fibre systems may also be envisaged. The use of cracked (i.e. stretch-broken) or selectively discontinuous fibres may be advantageous to facilitate lay-up of the product according to the invention and improve its capability of being shaped. Although a unidirectional fibre alignment is preferable, other forms may also be used. Typical textile forms include simple textile fabrics, knit fabrics, twill fabrics and satin weaves. It is also possible to envisage using non-woven or non-crimped fibre layers. The surface mass of fibres within the fibrous reinforcement is generally 80-4000 g/m2, preferably 100-2500 g/m2, and especially preferably 150-2000 g/m2. The number of carbon filaments per tow can vary from 3000 to 320,000, again preferably from 6,000 to 160,000 and most preferably from 12,000 to 48,000. For fibreglass reinforcements, fibres of 600-2400 tex are particularly adapted.

An exemplary epoxy resin matrix of the invention may comprise an epoxy formulation in combination with 18% by weight based on the matrix of a formulation comprising 50% Dicyandiamide in 50% Bisphenol-A epoxy resin (EEW 190, functionality 2) together with 4.5% by weight of a bis urea accelerator. The epoxy formulation comprising a phenoxy resin in combination with a 2-functional bisphenol-A epoxy resin (EEW 320) and an epoxy phenyl novolac resin (EEW 180). This provides a structure which is cured in 140 seconds when heated at 150° C. to provide a cured resin having a Tg of about 135° C.

The expandable filler may be any suitable material that can be retained within and can expand within the matrix in which it is contained. In a preferred embodiment, the filler is expandable during processing of the fibre reinforced layer which is preferably a prepreg. As discussed, during processing the reactive energy of the resin in the fibre reinforced layer and/or the matrix containing the expandable filler is increased. This can cause the filler particles to expand thereby increasing their volume. Typically the particle diameter expands by a factor of 2 to 20, preferably by a factor of 2 to 10, and more preferably by a factor of 2 to 6.

The expandable filler employed in the layer or layers comprising a matrix containing from 0.1 wt % to 60 wt % of the expandable filler in relation to the matrix before expansion of the filler, are preferably expandable microspheres which expand when heated and may be microspheres such as those marketed by the 3M company under the Scotchlite trade name. As preferred, polymer based microspheres such as those marketed by Akzo Nobel under the EXPANCEL trade name or ADVANCELL EM the thermal expandable microspheres of Sekisui Chemical Company. These microspheres can expand by a factor of at least 2, preferably 4 in diameter, resulting in a volume expansion of each particle of 64 or more. It is preferred that the microspheres expand at the temperatures used to cure the resin employed in the fibre containing layer.

Alternative expandable filler particles may be formed by expandable graphite. An example of expandable graphites are Grafguard™ 160-50, 220-50, 160-80, 220-80 and 250-50 as supplied by Graftech International. Expandable graphite has the advantage that the onset of expansion occurs at relatively high temperatures ranging from 120° C. up to 250° C., preferably from 160° C. up to 150° C. This allows the resin matrix to cure at higher temperatures which significantly decreases the overall cure time of the resin matrix. Before expansion, Graphite particles have a density of 1.1 $cm^3/g$. The particles can expand up to 8 times. The mean particle size as determined by a Malvern particle sizer (Mastersizer 2000) is in the range of from 250 to 350 microns.

Microspheres may be obtained in a range of densities and it is preferred to use expandable microspheres having a density in the range 5 $Kg/m^3$ to 40 $Kg/m^3$, or preferably 10 $Kg/m^3$ to 40 $Kg/m^3$, or more preferably 15 $Kg/m^3$ to 40 $Kg/m^3$. Expandable microspheres are used to reduce the weight of products based on thermoplastics and elastomers.

The preferred particles (microballoons) are like a fine powder, the hollow spheres ranging from 12-300 μm in diameter. Typically, the spheres may be manufactured from a phenolic polymer wherein, water-miscible phenolic resole resins are dissolved in water, after which a blowing agent, ammonium carbonate, is added. Spray drying produces discrete, uniform hollow spheres in sizes ranging from 5 μm to 50 μm in diameter. Significantly, the use of phenolic resin, which is naturally fire resistant, provides fabricators a non-halogenated flame-resistant filler with far less mass than other flame-retardant fillers, such as alumina trihydrate (ATH).

Other microspheres such as EXPANCEL of a density of 0.015 g/cc and consisting of a very thin thermoplastic shell (a copolymer, such as vinylidene chloride, acrylonitrile or methyl methacrylate) that encapsulates a hydrocarbon blowing agent (typically isobutene or isopentane) are particularly useful. When heated, the polymeric shell gradually softens, and the liquid hydrocarbon begins to gasify and expand. When the heat is removed, the shell stiffens and the microsphere remains in its expanded form. Expansion temperatures range from 80° C. to 190° C. The particle size for expanded microspheres ranges from 20-150 μm. When fully expanded, the volume of the microspheres increases more than 40 times. By incorporating plastic microspheres, as the part heats up, the resin is able to expand inward, causing the microspheres to compress. Once the heat dissipates, the spheres rebound. The microspheres retain their flexibility even after cure. A part that is subjected to thermal stress, such as a windmill blade that gets hot in the summer and cold in the winter, is aided by the microsphere that will help absorb some of the expansion/contraction force. Density reductions of 65% can be achieved with the optimal concentration of 4% thermoplastic microspheres (by weight). While plastic microspheres do not burst, and are well suited for high shear mixing and spray-up applications, they are more susceptible to heat damage and chemical interaction than glass spheres. Therefore, the choice of material could be dictated, to some extent, by the moulding process and the product end use. The most obvious benefit of the hollow microsphere is its potential to reduce part weight, which is a function of density. Compared to traditional mineral-based additives, such as calcium carbonate, gypsum, mica, silica and talc, hollow microspheres have much lower densities. Typical loadings are 1-5% by weight, which can equate to 25% or more by volume. The density and crush strength of microspheres made from a particular material will depend, in part, on two structural variables, wall thickness and particle size.

Generally, the thicker the wall, the stronger the material. But there are many factors that affect strength and density, and manufacturing processes. Particle size also plays a critical role in the microsphere's relative density and its survival rate, because smaller microspheres are better able to withstand the processing conditions of higher shear rates.

Furthermore, the use of microspheres enhances processability due to their small spherical structure. The microsphere's regularity minimizes its surface area and the low surface area allows for higher solids loading with less of an impact on the viscosity and flow characteristics of the composite. Additionally, the microsphere has a nominal 1:1 aspect ratio, giving it inherently isotropic properties that composites manufacturers can use to great advantage. Microspheres do not orient during processing so that stresses are more evenly distributed, enhancing both reinforcement and dimensional stability. In addition, the "ball bearing effect" of microspheres enables the resin to more easily infiltrate complex mould geometries, resulting in faster cycle times. Further, successful infiltration can occur at lower mould temperatures. The microsphere's regular shape can also contribute to product surface quality as they tend to remain more evenly dispersed throughout the matrix.

The preferred expandable filler therefore resides in expandable microspheres, and the propellant within the microsphere is normally a liquid having a boiling point not higher than the softening temperature of the thermoplastic polymer shell. Upon heating, the propellant evaporates to increase the internal pressure at the same time as the shell softens, resulting in significant expansion of the microspheres. The temperature at which the expansion starts is called Tstart, while the temperature at which maximum expansion is reached is called Tmax. Expandable microspheres are marketed in various forms, e.g. as dry free flowing particles, as an aqueous slurry or as a partially dewatered wet-cake. Expandable microspheres can be produced by polymerising ethylenically unsaturated monomers in the presence of a propellant. Usually the monomers mainly comprise monomers with one carbon-to-carbon double bond together with small amounts of cross-linking monomers having two or more carbon-to-carbon double bonds. Detailed descriptions of various expandable microspheres and their production can be found in, for example, U.S. Pat. Nos. 3,615,972, 3,945,956, 4,287,308, 5,536,756, 6,235,800, 6,235,394 and 6509384, 6617363 and 6984347, in US Patent Applications Publications US 2004/0176486 and 2005/0079352, in EP 486080, EP 1230975, EP 1288272, EP 1598405, EP 181 1007 and EP 1964903, in WO 2002/096635, WO 2004/072160, WO 2007/091960, WO 2007/091961 and WO 2007/142593, and in JP Laid Open No. 1987-286534 and 2005-272633.

The preferred thermally expandable thermoplastic microspheres therefore comprise a polymer shell made from ethylenically unsaturated monomers encapsulating a propellant, said ethylenically unsaturated monomers comprising at least one first cross-linking monomer having two or more carbon-to carbon double bonds.

The matrix material for the expandable filler containing layer should be selected according to the manner in which the layer is to be applied to the fibre containing layer, preferably a prepreg. The expandable filler containing material may be applied dry for example by powder coating or as is preferred as a flowing fluid. In this preferred embodiment the matrix material should be chosen so that the blend with the expandable filler has a viscosity that enables application to the fibre containing layer and yet retains the filler to minimise migration into the fibre containing layer. Migration of filler into the fibre containing layer is undesirable in that the filler can cause damage to the prepreg during curing. It is preferred that the viscosity is in the range 40 to 2000 Pa·s, preferably 60 to 1500 Pa·s, more preferably from 70 to 1200 Pa·s over a temperature range of from 60° C. to 84° C. This may conveniently be employed by the use of a liquid epoxy resin of viscosity 70 to 1100 Pa·s over the aforesaid temperature range.

Preferably the resin that provides the matrix is heated to a temperature below Tstart to reduce the viscosity of the resin before mixing in the expandable filler. This allows a higher expandable filler concentration to be mixed into the resin without adverse affecting the mixing and flow properties of the matrix forming resin. The mixing temperature is preferably lower than Tstart so that the filler is not expanded during mixing.

The expandable filler is incorporated within a matrix and any suitable matrix may be employed that can be cured under the conditions employed in the production of the laminar structure. As with the fibre reinforced layer it is preferred that the matrix comprises an epoxy resin and any of the epoxy resins previously described in relation to the fibre reinforced layer may be employed. In one embodiment the epoxy resin is one that cures under the same conditions, such as temperature and pressure that are used to cure the resin of the fibre containing layer and the same epoxy resin can be used in both the fibre reinforced layer and the expandable filler containing layer. The expandable filler is preferably chosen so that it expands as the resin cures and the temperature at which they expand should be below the Tg of the matrix in which they are contained. It is preferred that the expandable filler and the matrix be selected so that the temperature at which the filler begins to expand (Tstart) and the temperature at which it is fully expanded (Tmax) are both less than the glass transition temperature of the resin forming the matrix (Tg). If the matrix material is preheated to lower its viscosity before blending with the expandable filler then the preheat temperature (Tresin) should be below Tstart to prevent premature expansion of the filler. The resin forming the matrix should then be heated to a temperature at or above Tg to effect curing. The time for heating the resin to effect curing will depend upon the nature of the resin and the amount of resin curing employed. However, it is preferred to heat at a rate of 1° C. per second, preferably 5° C./s, more preferably 8° C./s, and most preferably 10° C./s up to and through Tmax until the cure temperature Tg is reached. The temperature should then be maintained for 30 s to 5 minutes, preferably from 1 min to 3 min, and more preferably from 1 min to 2 min to ensure curing and then be allowed to cool. Cooling may take place at a decreased at a rate of about 0.5, or 1, or 2, or 3, or 4, or 5, or 8, or 10° C. per second. Cooling may also take place in an ambient temperature environment.

The matrix is chosen so that it will cure as the filler expands to both allow expansion and provide a matrix of viscosity such that it contains the expandable filler and cures around the expanded filler to retain the expandable filler, enabling it to expand and limiting migration of the expanding filler into the fibre layers. Equally the resin of the fibre layer can be selected so that it will cure as the filler expands so providing a barrier to the filler migration into the fibre containing layer. Accordingly, preferred temperatures for cure are in the range of from 80° C. to 160° C., more preferably from 90° C. to 140° C. even more preferably from 100° C. to 120° C.

In another embodiment of the invention, there is provided a curable laminar structure comprising a fibrous reinforcement material and a resin matrix material, the matrix material comprising an expandable filler, the density of the laminar structure decreasing over the temperature range from ambient to the cure temperature of the matrix material. The density of the structure may range from 1 $g/m^2$ to 1000 $g/m^2$, preferably from 50 $g/m^2$ to 700 $g/m^2$, more preferably from 100 $g/m^2$ to 500 $g/m^2$ and/or combinations of the aforesaid ranges, at ambient temperature (21° C.) through to the cure temperature.

In an embodiment, there is provided a curable laminar structure with increased vibrational and acoustic damping. Expandable fillers of the type employed by the present invention exhibit higher elasticity than the surrounding matrix, and thus function to attenuate vibrational and acoustic noise. A laminate structure having expandable filler located within a core between layers of fibrous reinforcement material is particularly suited to the attenuation of vibrational and acoustic noise. Low density laminates with improved vibrational and acoustic performance are particularly suited for use in aerospace or automotive applications.

In an embodiment, the expandable filler particles may be coated with a conductive metallic or carbon coating. Thus when expanded, the particles provide a low density conductive pathway between layers of fibrous reinforcement. Such an embodiment is particularly suited improving lightning strike protection of panels on the exterior of aircraft, where low density, conductive laminates are required.

The laminar structures of the present invention have exceptional stiffness for their weight whilst having an improved stiffness to weight ratio and are particularly useful as structural panels in automotive, aerospace, railroad vehicles, marine vehicles, railroad and construction industries as well as in sporting goods such as skis and skate boards. They may also be used in wind turbine blades. In particular they are useful as internal and external panels in automobiles such as roof panels, door panels, floor panels and hard and boot panels. Automotive including cars, busses and trucks. The structures may also be well as internal floor and side cabin panels in aircraft as well as body panels and wings and boat bodies and internals.

The invention also provides a process for the production of laminar panels comprising providing a prepreg comprising a resin containing from 10 to 40 wt % fibre, coating the prepreg with a mixture comprising 0.01 wt % to 5 wt %, preferably from 0.1 to 3 wt %, more preferably from 0.4 to 2 wt %, and most preferably from 0.7 to 2 wt %, and/or combinations of the aforesaid ranges of an expandable filler in a curable matrix to provide a multi layer structure and heating the structure to a temperature in the range of from 80° C. to 120° C. to cure resin and the matrix material of both the prepreg and the mixture containing the expandable filler and to cause expansion of the expandable filler.

The expandable filler is preferably expandable microspheres and the prepreg is preferably one that can be cured at a temperature in the range 60° C. to 140° C., preferably from 80° C. to 120° C. and the microspheres preferably expand at a temperature in the range 80° C. to 160° C. and the matrix containing the microspheres preferably cures at a temperature in the range of from 120° C. to 160° C.

The resins and matrix forming the materials, the fibres and the microspheres that may be employed in this process are as previously described in relation to the laminar structure.

The process may involve providing several layers of the fibre containing material and several layers of the expandable filler containing material as is required according to the ultimate use of the laminar structure. The essence of the process is that the laminar structure will be formed without significant migration of the expandable or expanded filler into the fibre containing layer. This will depend upon the fibre content and the number and size of the interstices between the fibres, the size and volume of the filler and the conditions such as pressure and time of cure should be adjusted to minimise migration.

In an embodiment, there may be provided a prepreg structure comprising a resin core containing an expandable filler or particle, each side of the core being contacted with a fibrous reinforcement material. The fibrous reinforcement material may be at least partially unimpregnated to promote the release of entrapped air during processing and curing of the prepreg structure. One or more additional resin impregnated fibrous reinforcement materials may be provided on the fibrous reinforcement material which is in contact with the core.

Any low density microsphere can be used for the invention such as Grafguard or Expancel. Expancel is preferred for its ultra low density. Epoxy resins with chemical staging are also preferred as the matrix for the microspheres in order to facilitate mixing of unexpanded expandable particles by the very low viscosity of the resin before staging, and also to facilitate the handling of a resin film by the increased viscosity of the resin after staging.

The present invention may be illustrated by the following Examples.

EXAMPLE 1

A standard laminate was prepared from 4 layers of standard monolithic 0/90 carbon fibrous reinforcement comprising 4 plies and a resin matrix comprising the M77 resin as supplied by Hexcel. The standard laminate has a fibre volume content of 50% by volume as determined as outlined herein before. The laminate was cured at a temperature of 120° C.

A low density laminate was prepared from a resin matrix which contained a mixture of M77 resin and an expandable filler of the type EXPANCEL 920 DET 40 d25 as supplied by Akzo Nobel. This matrix was sandwiched between carbon fibrous layers 0/90 to form a core. On either side of the core, additional carbon fibrous layers were provided which were each impregnated with M77 matrix resin. The low density laminate was again cured at a temperature of 120° C.

The below Table 1 shows the comparative flexural results between a standard monolithic 0°/90° carbon laminate with 50% fibre volume content and the low density laminate.

TABLE 1

| Property | Standard Laminate | Low Density Laminate |
| --- | --- | --- |
| Density | 1.50 | 0.63 |
| Thickness (mm) | 2 | 4 |
| Mass areal weight (kg/m$^2$) | 3.1 | 2.52 |
| Flexural stiffness (N/mm) | 11.11 | 31.85 |
| Failure load (N) | 205 | 194 |
| Failure strength (MPa) | 855 | 195 |
| Failure deflexion (mm) | 20 | 6 |
| Flexural modulus (GPa) | 56.7 | 17.4 |
| Fibre volume content (%) | 50 | 10 |
| Fibre areal weight (kg/m$^2$) | 1.8 | 0.72 |

It is particularly noticeable that with a thickness twice the thickness of the standard laminate, the product of the invention provides a 19% weight reduction while the flexural stiffness is increased by a factor of 2.87 without any reduction in maximum load and there is a 60% mass reduction of fibre weight.

EXAMPLE 2

This Example demonstrates the preparation of the expanded microsphere containing resin film material.

100 parts of HexPly M10, a proprietary Dgeba-DDM epoxy resin of Hexcel Composites, was mixed with 4.5 parts of Expancel microspheres from Akzo Nobel, grade 920 DET 40 d25. This grade of Expancel is an expanded grade with a 35-55 micrometers particle size and a 25 kg/m$^3$ true density. The mixture was prepared at room temperature (21° C.) until complete wetting of Expancel particles by M10 resin occurred. The resulting density of the mixture was 0.36 g/cc. The resulting low density M10 mixing was B-staged at 23° C. for 7 days, the B-staged low density M10 batch was then divided in blocks and heated to 65° C. in an oven.

The heated blocks were provided with a resin film by a nip roll process at 65° C. The resulting film had a 75 g/m$^2$ areal weight and was rolled with onto a silicone paper foil. The resin may then be applied to any suitable medium such as fibrous reinforcement.

EXAMPLE 3

This Example illustrates the production of low density prepregs.

Carbon fabric/epoxy prepregs from Hexcel Composites, HexPly M49/42%/200T2X2/CHS-3K contains M49 resin, a 120° C. cure epoxy resin from Hexcel Composites and a fabric in the form of 200T2X2/CHS-3K, a 200 g/m$^2$ Twill 22 carbon fabric with 3K high strength standard modulus carbon fibres from Hexcel Composites. The prepregs were used to produce four grades of low density carbon prepregs by applying low density resin films containing different concentrations of expandable filler Expancel 920 DET 40 d25 onto the prepregs as follows:

Grade 1—HexPly M49/42%/200T2X2/CHS-3K with a layer of 75 g/m$^2$ low density resin on one side, the low density resin containing 100 parts by weight of M49 resin in combination with 4.5 parts by weight of expandable filler particles;

Grade 2—HexPly M49/42%/200T2X2/CHS-3K with two layers of 75 g/m$^2$ low density resin, the low density resin containing 100 parts by weight of M49 resin in combination with 4.5 parts by weight of expandable filler particles as used in Grade 1 (with 2 plies of film);

Grade 3—HexPly M49/42%/200T2X2/CHS-3K with three layers of the low density resin of Grade 1 to produce a 225 g/m$^2$ resin on one side (with 3 plies of film);

Finally, Grade 4—HexPly M49/42%/200T2X2/CHS-3K with four layers of the low density resin of Grade 1 to produce a 300 g/m$^2$ resin on one side (with 4 plies of film).

Five laminates have been moulded for mechanical comparison tests.

Laminate 0: composed of 9 plies of the above M49 carbon fabric hexPly prepreg

Laminate 1: composed of 4 plies of Grade 1 low density carbon prepregs whereby the centre is formed by two layers of the prepreg whereby the low density resin layers are in contact with one another. The centre layer thus formed is contacted with two further Grade 1 low density carbon prepregs whereby the low density resin layers of these prepregs contact the centre layer;

Laminate 2: composed of 4 plies of Grade 2 density carbon prepreg with the same lay-up sequence as described with respect to Laminate 1;

Laminate 3: composed of 4 plies of Grade 3 low density carbon prepreg with the same lay-up sequence as described with respect to Laminate 2; and Laminate 4: composed of 4 plies of Grade 4 low density carbon prepreg with the same lay-up sequence as described with respect to Laminate 3

Test results for the five laminates are presented in Table 2.

TABLE 2

| | | Laminate 0 | Laminate 1 | Laminate 2 | Laminate 3 | Laminate 4 |
| --- | --- | --- | --- | --- | --- | --- |
| Density | | 1.50 | 0.89 | 0.79 | 0.71 | 0.63 |
| Thickness | mm | 2.13 | 1.81 | 2.49 | 3.21 | 4.08 |
| Fibre Volume Content | % | 46.9 | 24.5 | 17.8 | 13.8 | 10.9 |
| Traction | Strength (MPa) | 861.3 | 427 | 213.2 | 215 | 142 |
| | Modulus (GPa) | 58.9 | 31.3 | 19.8 | 18.7 | 13.2 |
| Flexion | Strength (MPa) | 993.5 | 326.5 | 328.5 | 311.7 | 177.3 |
| | Modulus (GPa) | 58.9 | 33.2 | 27.0 | 23.5 | 17.9 |
| ILSS | Strength (MPa) | 61.2 | 13.4 | 10.5 | 11.3 | 8.5 |

From the data in the Table we have calculated Modulus$^{1/3}$/Density to compare the flexural stiffness of the various materials. In the below Table 3 the values are presented for the five laminates in relation to the standard Laminate 0.

TABLE 3

| | Laminate 0 | Laminate 1 | Laminate 2 | Laminate 3 | Laminate 4 |
| --- | --- | --- | --- | --- | --- |
| Modulus$^{1/3}$/Density | 2.59 | 3.61 | 3.80 | 4.03 | 4.15 |
| Gain (%) | Ref | 39 | 47 | 55 | 60 |

The product of the invention has the important economic advantage that the carbon fibre content (which is costly) may be reduced whilst still reducing the weight and improving the mechanical properties of structural material.

Table 4 compares a product of this invention with products of comparable rigidity based on traditional monolithic laminar structures and glass reinforced sandwich compositions which have the same stiffness.

TABLE 4

|  | Monolithic (single layer of impregnated carbon fiber) | Multi-Sandwich (as Laminate 4 in Table 2) |
| --- | --- | --- |
| Thickness (h) | 2.9 mm | 4 mm |
| Weight (m$^2$) | 4.5 kg/m$^2$ | 2.8 kg/m$^2$ |
| Flexural Modulus | 50 Gpa | 19 Gpa |
| Stiffness (E · h$^3$) | 1216 | 1216 |
| Volume of Fibre | 50% (carbon) | 11% (carbon) |
| Volume of Resin | 50% | 42% |
| Volume of Air | — | 47% |
| Weight of Fibre | 2.61 kg/m$^2$ (58%) | 0.80 kg/m$^2$ (29%) |
| Weight of Resin | 1.74 kg/m$^2$ (42%) | 1.99 kg/m$^2$ (71%) |

The invention claimed is:

1. A laminar structure comprising a fibre reinforced layer bonded to a layer comprising an expanded filler within a cured matrix wherein the fibre reinforced layer has a thickness of from 5 mm to 50 mm and the layer comprising the expanded filler within a cured matrix has a thickness of from 4 mm to 49 mm and the laminar structure has a reduced density in comparison to the uncured laminate of from 10% to 65%.

2. A laminar structure according to claim 1 in which the fibre reinforced layer has a weight ranging from 5 to 800 gsm.

3. A laminar structure according to claim 1 in which the expanded filler particles have an increased diameter by a factor of 2 to 20 in comparison to their diameter prior to expansion.

4. A laminar structure according to claim 1 wherein said fibre reinforced layer contains from 10 to 40 wt % by weight of the structure of fibres and wherein said layer contains cured matrix in an amount which is from 0.1% to 10% by weight in relation to said expanded filler.

5. A process for the production of laminar structures according to claim 4 comprising providing a prepreg comprising a resin containing from 10 to 40 wt % fibre, coating the prepreg with a mixture comprising 0.1 wt to 5 wt % of an expandable filler in a curable matrix to provide a multi layer structure and heating the structure to a temperature in the range 80° C. to 120° C. to cure the resin and the matrix material of both the prepreg and the mixture containing the filler and to cause expansion of the expandable filler.

6. A process according to claim 5 in which the expandable filler comprises expandable microspheres and the prepreg is curable at a temperature in the range 80° C. to 120° C. and the microspheres expand at a temperature in the range 80° C. to 100° C. and the matrix containing the microspheres cures at a temperature in the range of 100° C. to 120° C.

7. A process according to claim 5 comprising providing prepreg and providing a mixture comprising an expandable filler within a curable matrix wherein the expandable microsphere starts to expand at a temperature Tstart and completes expansion at a temperature Tmax and the curable matrix cures at a temperature Tg wherein Tstart and Tmax are both lower than Tg, said process further comprising applying the mixture to the prepreg at a temperature below Tstart to provide a laminar structure and heating the laminar structure to at least Tg to cause the microspheres to expand and the matrix to cure.

8. A process according to claim 7 in which the mixture of expandable microspheres and a curable matrix has a viscosity in the range 100 Pa·s to 1000 Pa·s over the temperature range of 60° C. to 85° C.

9. A process according to claim 5 wherein the resin of the prepreg cures at a temperature in the range Tstart to Tg.

10. A process according to claim 5 comprising heating the laminar structure up to Tg at a rate of from 1° C. to 5° C. per second, holding the temperature at Tg or higher for from 30 to 180 seconds and then cooling the laminar structure.

11. A process for making a moulded part or article in a single moulding step, said process comprising the steps of providing a laminar structure according to claim 4 and moulding said laminar structure in a single step by compressing said laminar structure whilst heating the laminar structure to expand the expandable filler, followed by subsequent cure of the matrix, whereby the volume of the laminar structure prior to cure is smaller than the volume of the cured structure.

* * * * *